United States Patent
Tang et al.

(10) Patent No.: US 10,285,086 B2
(45) Date of Patent: May 7, 2019

(54) CHANNEL DECODING METHOD AND APPARATUS, AND DISTRIBUTED DECODER

(71) Applicant: Huawei Technologies Co., Ltd., Shenzhen (CN)

(72) Inventors: Xin Tang, Shanghai (CN); Ming Li, Shanghai (CN); Yuejun Wei, Shanghai (CN); Jie Xiong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 15/233,646

(22) Filed: Aug. 10, 2016

(65) Prior Publication Data
US 2016/0353312 A1  Dec. 1, 2016

Related U.S. Application Data (63) Continuation of application No. PCT/CN2014/071966, filed on Feb. 11, 2014.

(51) Int. Cl.
*H04W 24/10* (2009.01)
*H04L 1/00* (2006.01)
(Continued)

(52) U.S. Cl.
CPC .............. *H04W 24/10* (2013.01); *H04L 1/00* (2013.01); *H04L 1/0045* (2013.01); *H04L 43/0823* (2013.01); *H04W 84/045* (2013.01)

(58) Field of Classification Search
None
See application file for complete search history.

(56) References Cited

U.S. PATENT DOCUMENTS

| | | | | |
|---|---|---|---|---|
| 6,092,230 A | * | 7/2000 | Wood | H03M 13/00 |
| | | | | 714/755 |
| 6,105,158 A | * | 8/2000 | Chen | H03M 13/09 |
| | | | | 714/755 |

(Continued)

FOREIGN PATENT DOCUMENTS

| | | |
|---|---|---|
| CN | 1332905 A | 1/2002 |
| CN | 1385983 A | 12/2002 |

(Continued)

OTHER PUBLICATIONS

Bui et al.,"A Decode and Forward Cooperation Scheme With Soft Relaying in Wireless Communication" Signal Processing Advances in Wireless Communications, XP31189409A, Institute of Electrical and Electronics Engineers, New York, New York (2007).

*Primary Examiner* — Kibrom T Hailu
(74) *Attorney, Agent, or Firm* — Leydig, Voit & Mayer, Ltd.

(57) ABSTRACT

Embodiments disclose a channel decoding method and apparatus, and a distributed decoder. A channel decoding apparatus includes: a decoding information acquiring unit, configured to acquire demodulation information of a channel; a channel decoding algorithm unit, configured to decode the demodulation information to obtain current decoding information, and perform a cyclic redundancy check CRC check on the current decoding information to obtain a current decoding CRC check result; and a lower level decoding determining unit, configured to: if the current decoding CRC check result is incorrect and a lower level channel decoding apparatus exists, determine that the lower level channel decoding apparatus continues to decode the demodulation information, where decoding performance of a channel decoding algorithm unit in the lower level channel decoding apparatus is superior to decoding performance of (Continued)

the channel decoding algorithm unit in the channel decoding apparatus.

18 Claims, 3 Drawing Sheets

(51) Int. Cl.
*H04L 12/26* (2006.01)
*H04W 84/04* (2009.01)

(56) References Cited

U.S. PATENT DOCUMENTS

| | | | |
|---|---|---|---|
| 6,272,660 B1* | 8/2001 | Chen | H03M 13/09 714/794 |
| 6,615,385 B1 | 9/2003 | Kim et al. | |
| 7,051,268 B1* | 5/2006 | Sindhushayana | H04L 1/0045 714/786 |
| 2002/0181634 A1* | 12/2002 | Yang | H04B 1/7083 375/354 |
| 2009/0019338 A1 | 1/2009 | Obuchi et al. | |
| 2009/0106637 A1 | 4/2009 | Kim et al. | |
| 2010/0192040 A1 | 7/2010 | Yedidia et al. | |
| 2010/0208666 A1* | 8/2010 | Frederiksen | H04B 7/2637 370/329 |
| 2011/0158359 A1* | 6/2011 | Khayrallah | H03M 13/2957 375/346 |
| 2014/0089770 A1 | 3/2014 | Wei et al. | |
| 2014/0219196 A1* | 8/2014 | Patel | H04L 5/0091 370/329 |

FOREIGN PATENT DOCUMENTS

| | | |
|---|---|---|
| CN | 101814975 A | 8/2010 |
| EP | 1942579 A1 | 7/2008 |
| WO | WO 2012163099 A1 | 12/2012 |

* cited by examiner

CHANNEL DECODING METHOD AND APPARATUS, AND DISTRIBUTED DECODER

CROSS-REFERENCE TO RELATED APPLICATIONS

This application is a continuation of International Application No. PCT/CN2014/071966, filed on Feb. 11, 2014, which is hereby incorporated by reference in its entirety.

TECHNICAL FIELD

Embodiments of the present disclosure relate to the field of communications, and in particular, to a channel decoding method and apparatus, and a distributed decoder.

BACKGROUND

Channel decoders that are commonly used include a Viterbi algorithm (VA) decoder and a list Viterbi algorithm (LVA) decoder.

A common VA decoder selects an optimal path from all possible paths on a grid graph, and outputs an information sequence corresponding to the optimal path as a decoding result. An LVA decoder is an enhanced Viterbi decoding algorithm decoder using a cyclic redundancy check (CRC) for an auxiliary decision, and a basic principle is: decoding sequences corresponding to multiple candidate paths are output, a CRC check is separately performed on these decoding sequences, and a decoding sequence whose CRC check result is correct is selected as a final decoding result; and if none of the decoding sequences corresponding to all the paths passes the CRC check, a decoding sequence of an optimal path is output as a result. A parallel list Viterbi decoding algorithm (PLVA) decoder refers to a parallel LVA decoder, which can select a path whose CRC check result is correct from multiple paths, and has better performance than the common VA decoder that selects only an optimal path. A larger quantity of paths searched by the PLVA decoder indicates better decoding performance of the PLVA decoder and also brings heavier processing load on the PLVA decoder. Generally, for example, a PLVA4 decoder is a decoder that searches four paths, a PLVA64 decoder is a decoder that searches 64 paths, and decoding performance of the PLVA64 decoder is better than that of the PLVA4 decoder.

In the Universal Mobile Telecommunications System (UMTS), an adaptive multi-rate (AMR) speech is divided into three substreams: substreams A, B and C. Importance of the substream A is highest, and a CRC check is attached to a tail of a data block of the substream A. Importance of the substreams B/C is relatively low, and data has no CRC check. A channel decoder is deployed on a NodeB, separately decodes the substreams AB/C, and performs a CRC check on the substream A. In the prior art, the NodeB generally uses a VA to perform decoding, and in order to achieve better decoding performance, deployment of a PLVA may be considered. However, the PLVA needs high algorithm overheads, and therefore consumes much processing performance of the NodeB if the PLVA is deployed on the NodeB.

SUMMARY

In view of this, embodiments of the present disclosure provide a channel decoding method and apparatus, and a distributed decoder, so as to implement that all levels of channel decoding apparatuses are distributed on different network nodes, thereby not only improving decoding performance, but also avoiding high processing overheads.

According to a first aspect, a channel decoding apparatus is provided, including:

a decoding information acquiring unit, configured to acquire demodulation information of a channel;

a channel decoding algorithm unit, configured to decode the demodulation information acquired by the decoding information acquiring unit to obtain current decoding information, and perform a cyclic redundancy check (CRC) check on the current decoding information to obtain a current decoding CRC check result; and a lower level decoding determining unit, configured to: if the current decoding CRC check result obtained by the channel decoding algorithm unit is incorrect and a lower level channel decoding apparatus exists, determine that the lower level channel decoding apparatus continues to decode the demodulation information, where decoding performance of a channel decoding algorithm unit in the lower level channel decoding apparatus is superior to decoding performance of the channel decoding algorithm unit in the channel decoding apparatus.

In a first possible implementation manner of the first aspect, the decoding information acquiring unit is specifically configured to acquire the demodulation information of the channel from a demodulator, or acquire the demodulation information of the channel from any upper level decoding apparatus before the channel decoding apparatus.

With reference to the first possible implementation manner of the first aspect, in a second possible implementation manner of the first aspect, when the decoding information acquiring unit acquires the demodulation information of the channel from the any upper level channel decoding apparatus before the channel decoding apparatus, the decoding information acquiring unit is further configured to acquire the any upper level decoding information from the any upper level channel decoding apparatus before the channel decoding apparatus, and use the any upper level decoding information as auxiliary decoding information; and the channel decoding algorithm unit is further configured to use the auxiliary decoding information to perform auxiliary decoding on the demodulation information.

With reference to any one of the foregoing possible implementation manners of the first aspect, in a third possible implementation manner of the first aspect, the apparatus further includes a decoding information transmission unit, configured to transmit the demodulation information to the lower level channel decoding apparatus when the lower level decoding determining unit determines that the lower level channel decoding apparatus continues to decode the demodulation information.

With reference to the third possible implementation manner of the first aspect, in a fourth possible implementation manner of the first aspect, the decoding information transmission unit is further configured to: when the lower level decoding determining unit determines that the lower level channel decoding apparatus continues to decode the demodulation information, transmit the current decoding information obtained by the channel decoding algorithm unit to the lower level channel decoding apparatus to perform auxiliary decoding.

With reference to any one of the foregoing possible implementation manners of the first aspect, in a fifth possible implementation manner of the first aspect, the lower level decoding determining unit is further configured to end decoding if the current decoding CRC check result is correct; or end decoding if the current channel decoding apparatus is a last level channel decoding apparatus.

With reference to any one of the foregoing possible implementation manners of the first aspect, in a sixth possible implementation manner of the first aspect, the demodulation information may be any one of the following: demodulation information of any substream of an adaptive multi-rate (AMR) speech service, demodulation information of a data service, or demodulation information of signaling.

With reference to any one of the foregoing possible implementation manners of the first aspect, in a seventh possible implementation manner of the first aspect, the channel decoding algorithm unit performs decoding by using a Viterbi decoding algorithm (VA), and the channel decoding algorithm unit in the lower level channel decoding apparatus performs decoding by using a list Viterbi algorithm (LVA), a parallel list Viterbi algorithm (PLVA), or a serial list Viterbi algorithm (SLVA).

With reference to any one of the foregoing possible implementation manners of the first aspect, in an eighth possible implementation manner of the first aspect, the channel decoding apparatus and the lower level channel decoding apparatus of the channel decoding apparatus are deployed on different network nodes to perform decoding.

With reference to the eighth possible implementation manner of the first aspect, in a ninth possible implementation manner of the first aspect, the channel decoding apparatus is deployed on a base station node (NodeB), and the lower level channel decoding apparatus is deployed on a radio network controller (RNC).

According to a second aspect, a channel decoding method is provided, the method is used in any level of channel decoding apparatus in a distributed decoder, the distributed decoder includes at least two levels of channel decoding apparatuses, and the method includes:

acquiring demodulation information of a channel;

decoding the demodulation information to obtain current decoding information, and performing a cyclic redundancy check (CRC) check on the current decoding information to obtain a current decoding CRC check result; and if the current decoding CRC check result is incorrect and a lower level channel decoding apparatus exists, determining that the lower level channel decoding apparatus continues to decode the demodulation information, where decoding performance of the lower level channel decoding apparatus is superior to decoding performance of the current channel decoding apparatus.

In a first possible implementation manner of the second aspect, the acquiring demodulation information of a channel includes: acquiring the demodulation information of the channel from a demodulator, or acquiring the demodulation information of the channel from any upper level channel decoding apparatus before the current channel decoding apparatus.

With reference to the first possible implementation manner of the second aspect, in a second possible implementation manner of the second aspect, when the demodulation information of the channel is acquired from the any upper level channel decoding apparatus before the current channel decoding apparatus, the acquiring demodulation information of a channel further includes: acquiring the any level decoding information from the any upper level channel decoding apparatus before the current channel decoding apparatus, and using the any upper level decoding information as auxiliary decoding information; and the decoding the demodulation information to obtain current decoding information further includes: performing auxiliary decoding on the demodulation information by using the auxiliary decoding information.

With reference to any one of the foregoing possible implementation manners of the second aspect, in a third possible implementation manner of the second aspect, if it is determined that the lower level channel decoding apparatus continues to decode the demodulation information, the method further includes: transmitting the demodulation information to the lower level channel decoding apparatus.

With reference to the third possible implementation manner of the second aspect, in a fourth possible implementation manner of the second aspect, the transmitting the demodulation information to the lower level channel decoding apparatus further includes: transmitting the current decoding information to the lower level channel decoding apparatus to perform auxiliary decoding.

With reference to any one of the foregoing possible implementation manners of the second aspect, in a fifth possible implementation manner of the second aspect, the method further includes: ending decoding if the current decoding CRC check result is correct; or ending decoding if the current channel decoding apparatus is a last level channel decoding apparatus.

With reference to any one of the foregoing possible implementation manners of the second aspect, in a sixth possible implementation manner of the second aspect, the demodulation information may be any one of the following: demodulation information of any substream of an adaptive multi-rate (AMR) speech service, demodulation information of a data service, or demodulation information of signaling.

With reference to any one of the foregoing possible implementation manners of the second aspect, in a seventh possible implementation manner of the second aspect, the decoding the demodulation information to obtain current decoding information is decoding the demodulation information by using a Viterbi decoding algorithm (VA), and performing, by the lower level channel decoding apparatus, decoding by using a list Viterbi algorithm (LVA), a parallel list Viterbi algorithm (PLVA), or a serial list Viterbi algorithm (SLVA).

With reference to any one of the foregoing possible implementation manners of the second aspect, in an eighth possible implementation manner of the second aspect, the current channel decoding apparatus and the lower level channel decoding apparatus are deployed on different network nodes to perform decoding.

With reference to the eighth possible implementation manner of the second aspect, in a ninth possible implementation manner of the second aspect, the current channel decoding apparatus is deployed on a base station node (NodeB), and the lower level channel decoding apparatus is deployed on a radio network controller (RNC).

According to a third aspect, a computer program product is provided, the computer program product stores one or more sets of computer programs, and the computer programs are run to execute the method according to any possible implementation manner of the second aspect.

According to a fourth aspect, a distributed decoder is provided, the distributed decoder includes at least two channel decoding apparatuses according to any possible implementation manner of the first aspect, the channel decoding apparatuses are in a cascading connection between an upper level and a lower level, and decoding performance of a lower level channel decoding apparatus is superior to decoding performance of an upper level channel decoding apparatus.

According to the method, the apparatus, and the distributed decoder in the embodiments of the present disclosure, decoding and a CRC check may be performed on any demodulation information of a channel, and it is determined, according to a CRC check result, whether to use a lower level channel decoding apparatus that has higher decoding performance to perform hierarchical decoding. Compared with a traditional practice of using only one level of decoding apparatus, the embodiments of the present disclosure can not only improve decoding performance, but also avoid high processing overheads caused when all demodulation information is decoded by using a high performance channel decoding apparatus. In addition, all levels of channel decoding apparatuses are distributed on different network nodes, and do not need to be centralized on all NodeBs, thereby reducing a quantity of deployed high performance channel decoding apparatuses, and making configuration more flexible.

DESCRIPTION OF EMBODIMENTS

The following clearly describes the technical solutions in the embodiments of the present disclosure with reference to the accompanying drawings in the embodiments of the present disclosure. It may be understood that, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

A method, an apparatus, and a distributed decoder in the embodiments of the present disclosure may be implemented by using a radio access network device, and implementation of the radio access network device includes but is not limited to using any one of or jointly using more than one of the following: a base station NodeB, a radio network controller (RNC), or a control node of another access network device. In the embodiments of the present disclosure, a user and user equipment mean the same to a radio access network device.

In the embodiments of the present disclosure, demodulation information obtained by a demodulator is first sent to a first level channel decoding apparatus for decoding. It should be noted that, the demodulation information may be demodulation information of any one of a substream A, a substream B, and a substream C of an AMR speech service, or may be demodulation information of a data service or signaling. If a CRC check on decoding information obtained after decoding performed by the first level channel decoding apparatus fails, the demodulation information is sent to a lower level channel decoding apparatus for decoding. A CRC check is performed after each level of channel decoding apparatus decodes the demodulation information, and if the check fails, the demodulation information is sent to a lower level channel decoding apparatus of this level of channel decoding apparatus to continue to perform decoding, until a decoding CRC check of one level of channel decoding apparatus succeeds or a last level channel decoding apparatus completes decoding. All levels of channel decoding apparatuses may be separately deployed on different network nodes, and do not need to be deployed together on one network node.

Figure 1:
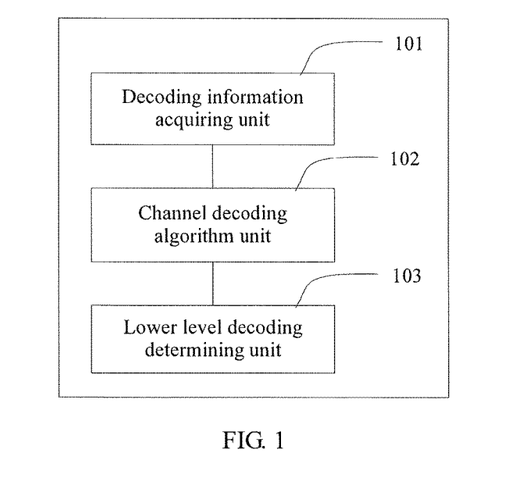
FIG. 1 is a structural diagram of a channel decoding apparatus according to an embodiment of the present disclosure.

FIG. 1 is a structural diagram of a channel decoding apparatus according to an embodiment of the present disclosure. The channel decoding apparatus and another channel decoding apparatus are separately deployed on different network nodes, and the channel decoding apparatus decodes demodulation information by using a channel decoding algorithm that is different from that used by the another channel decoding apparatus. Compared with a lower level channel decoding apparatus of the channel decoding apparatus, the channel decoding apparatus is inferior to the lower level channel decoding apparatus in terms of decoding performance. As shown in the figure, the apparatus may include: a decoding information acquiring unit 101, a channel decoding algorithm unit 102, and a lower level decoding determining unit 103.

The decoding information acquiring unit 101 is configured to acquire demodulation information.

If the channel decoding apparatus is a first level channel decoding apparatus, the decoding information acquiring unit 101 may specifically acquire the demodulation information from a demodulator.

If the channel decoding apparatus is any lower level channel decoding apparatus of the first level channel decoding apparatus, the decoding information acquiring unit 101 may specifically directly acquire the demodulation information from the demodulator, or may acquire the demodulation information from any upper level channel decoding apparatus before a current channel decoding apparatus, which depends on whether transmission of the demodulation information is supported between the current channel decoding apparatus and the demodulator or between the current channel decoding apparatus and the any upper level channel decoding apparatus. For example, if the channel decoding apparatus is a third level channel decoding apparatus, the decoding information acquiring unit 101 may acquire the demodulation information from a second level channel decoding apparatus, or may acquire the demodulation information from the first level channel decoding apparatus, or may directly acquire the demodulation information from the demodulator. It should be noted that, herein is merely an example, and this embodiment of the present disclosure is not limited thereto.

In another embodiment of the present disclosure, the decoding information acquiring unit 101 may further acquire the any level decoding information from any upper level channel decoding apparatus before the current channel decoding apparatus for auxiliary decoding of the current channel decoding apparatus to improve decoding accuracy.

The channel decoding algorithm unit 102 is configured to decode the demodulation information acquired by the decoding information acquiring unit 101 to obtain current decoding information, and perform a CRC check on the current decoding information to obtain a current decoding CRC check result.

The channel decoding algorithm unit 102 decodes, by using a channel decoding algorithm, the demodulation information acquired by the decoding information acquiring unit 101, so as to obtain the current decoding information. The channel decoding algorithm herein may be a VA, or may be an LVA, a PLVA, an SLVA, or the like, or may be another channel decoding algorithm, where the PLVA may further be classified into a PLVA4, a PLVA64, and the like according to a quantity of paths searched by the PLVA, and the present disclosure is not limited thereto. Channel decoding algorithm units in different levels of channel decoding apparatuses use different channel decoding algorithms, and decoding performance of a channel decoding algorithm of a next level of channel decoding apparatus is superior to decoding performance of a channel decoding algorithm of a channel decoding apparatus which level is previous to the next level. Decoding performance of the channel decoding algorithm unit 102 is superior to decoding performance of a channel decoding algorithm unit in any upper level channel decoding apparatus before the current channel decoding apparatus, and decoding performance of a channel decoding algorithm unit in a lower level channel decoding apparatus is superior to that of the channel decoding algorithm unit 102 in the current channel decoding apparatus. For example, if the channel decoding apparatus is the first level channel decoding apparatus, the channel decoding algorithm unit 102 may perform decoding by using the VA, and a channel decoding algorithm unit in a second level channel decoding apparatus may perform decoding by using the LVA. For another example, if the channel decoding apparatus is the first level channel decoding apparatus, the channel decoding algorithm unit 102 may perform decoding by using the VA, the channel decoding algorithm unit in the second level channel decoding apparatus may perform decoding by using the PLVA4, and a channel decoding algorithm unit in the third level channel decoding apparatus may perform decoding by using the PLVA64. It should be noted that, herein is merely an example, and this embodiment of the present disclosure is not limited thereto.

The lower level decoding determining unit 103 is configured to: if the current decoding CRC check result obtained by the channel decoding algorithm unit 102 is incorrect and a lower level channel decoding apparatus exists, determine that the lower level channel decoding apparatus continues to decode the demodulation information.

Decoding performance of a channel decoding algorithm unit in the lower level channel decoding apparatus is superior to the decoding performance of the channel decoding algorithm unit 102.

If the current decoding CRC check result obtained by the channel decoding algorithm unit 102 is incorrect and the lower level channel decoding apparatus exists, it is determined that the lower level channel decoding apparatus continues to decode the demodulation information.

If it is determined that the lower level channel decoding apparatus continues to perform decoding, the lower level channel decoding apparatus may acquire the demodulation information from the current channel decoding apparatus, or may acquire the demodulation information from the demodulator, or may acquire the demodulation information from any upper level channel decoding apparatus before the current channel decoding apparatus, and this embodiment of the present disclosure is not limited thereto.

In an embodiment of the present disclosure, the channel decoding apparatus may further include a decoding information transmission unit. The decoding information transmission unit is configured to transmit the demodulation information to the lower level channel decoding apparatus when the lower level decoding determining unit 103 determines that the lower level channel decoding apparatus continues to decode the demodulation information. The decoding information transmission unit may further transmit the current decoding information obtained by the channel decoding algorithm unit 102 by means of decoding to the lower level channel decoding apparatus, so that the lower level channel decoding apparatus performs auxiliary decoding according to the decoding information, so as to improve decoding accuracy.

In still another embodiment of the present disclosure, if the current decoding CRC check result obtained by the channel decoding algorithm unit 102 is correct, decoding may be ended. For example, when demodulation information of any substream of AMR is decoded, current decoding information may be sent to an AMR framing module for AMR speech framing together with decoding information of another substream. For a substream A of AMR, a current decoding CRC check result may further be sent to an outer loop power control module for an outer loop power control decision.

In still another embodiment of the present disclosure, if the current channel decoding apparatus is a last level channel decoding apparatus, decoding also needs to be ended after decoding on the demodulation information is completed and a CRC check is performed on the decoding information. In this case, if the CRC check of the last level channel decoding apparatus fails, a decoding error is reported for the demodulation information because all levels of channel decoding apparatuses fail to obtain a correct decoding result of a CRC check.

It should be noted that, the current channel decoding apparatus and the lower level channel decoding apparatus may be deployed on different network nodes, so as to avoid relatively heavy load caused to processing of a same network node when the current channel decoding apparatus and the lower level channel decoding apparatus are deployed together on the network node. For example, the channel decoding apparatus is deployed on a base station node (NodeB), and the lower level channel decoding apparatus may be deployed on a radio network controller (RNC). For another example, when a transmission node exists between the RNC and the NodeB, the first level channel decoding apparatus is deployed on the NodeB, the second level channel decoding apparatus is deployed on the transmission node between the RNC and the NodeB, and the third level channel decoding apparatus is deployed on the RNC. This embodiment of the present disclosure is not limited thereto.

According to the apparatus in this embodiment of the present disclosure, decoding and a CRC check may be performed on any demodulation information of a channel, and it is determined, according to a CRC check result, whether to use a lower level channel decoding apparatus that has higher decoding performance to perform hierarchical decoding. Generally, for most demodulation information, a correct decoding result can be obtained by means of first level decoding. Assuming that a bit error rate is 10%, demodulation information that enters a next level of decoding accounts only for 10% of all demodulation information. That is, only 10% of the demodulation information needs to be decoded by using a higher performance channel decoding apparatus, so as to achieve better performance. Compared with a traditional practice of using only one level of decoding apparatus, the apparatus in this embodiment of the present disclosure can not only improve decoding performance, but also avoid high processing overheads caused when all demodulation information is decoded by using a high performance channel decoding apparatus. In addition, all levels of channel decoding apparatuses are distributed on various network nodes, and do not need to be centralized on all NodeBs, thereby reducing a quantity of deployed high performance channel decoding apparatuses, and making configuration more flexible.

Figure 2:
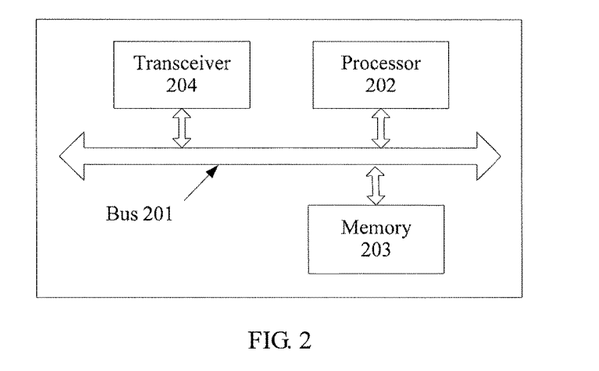
FIG. 2 is a structural diagram of a channel decoding apparatus according to another embodiment of the present disclosure.

FIG. 2 is a structural diagram of a channel decoding apparatus according to an embodiment of the present disclosure. The channel decoding apparatus and another channel decoding apparatus are separately deployed on different network nodes, and the channel decoding apparatus decodes demodulation information by using a channel decoding algorithm that is different from that used by the another channel decoding apparatus. Compared with a lower level channel decoding apparatus of the channel decoding apparatus, the channel decoding apparatus is inferior to the lower level channel decoding apparatus in terms of decoding performance. As shown in the figure, the apparatus may include: a bus 201, a processor 202 connected to the bus 201, a memory 203 connected to the bus 201, and a transceiver 204 connected to the bus 201. The processor 202 invokes, by using the bus 201, a program stored in the memory 203, so as to: control the transceiver 204 to acquire demodulation information; decode the acquired demodulation information to obtain current decoding information, and perform a CRC check on the current decoding information to obtain a current decoding CRC check result; and if the current decoding CRC check result is incorrect and a lower level channel decoding apparatus exists, determine that the lower level channel decoding apparatus continues to decode the demodulation information, where decoding performance of the lower level channel decoding apparatus is superior to decoding performance of the current channel decoding apparatus.

The transceiver 204 may acquire the demodulation information in multiple manners. For example, if the channel decoding apparatus is a first level channel decoding apparatus, the processor 202 is configured to control the transceiver 204 to acquire the demodulation information from a demodulator. For another example, if the channel decoding apparatus is any lower level channel decoding apparatus of the first level channel decoding apparatus, the transceiver 204 may directly acquire the demodulation information from the demodulator, or may acquire the demodulation information from any upper level channel decoding apparatus before the current channel decoding apparatus, which depends on whether transmission of the demodulation information is supported between the current channel decoding apparatus and the demodulator or between the current channel decoding apparatus and the any upper level channel decoding apparatus. For example, if the channel decoding apparatus is a third level channel decoding apparatus, the transceiver 204 may acquire the demodulation information from a second level channel decoding apparatus, or may acquire the demodulation information from the first level channel decoding apparatus, or may directly acquire the demodulation information from the demodulator. It should be noted that, herein is merely an example, and this embodiment of the present disclosure is not limited thereto.

In another embodiment of the present disclosure, the transceiver 204 may further acquire the any level decoding information from any upper level channel decoding apparatus before the current channel decoding apparatus for auxiliary decoding of the current channel decoding apparatus to improve decoding accuracy. For example, if the channel decoding apparatus is the second level channel decoding apparatus, the transceiver 204 may acquire the demodulation information from the first level channel decoding apparatus, and acquire first level decoding information from the first level channel decoding apparatus for auxiliary decoding. It should be noted that, herein is merely an example, and this embodiment of the present disclosure is not limited thereto.

The processor 202 may decode the demodulation information by using multiple channel decoding algorithms. For example, a channel decoding algorithm may be a VA, or may be an LVA, a PLVA, or an SLVA, or may be another channel decoding algorithm, where the PLVA may further be classified into a PLVA4, a PLVA64, and the like according to a quantity of paths searched by the PLVA, and the present disclosure is not limited thereto. Decoding performance of a channel decoding algorithm used by the processor 202 is superior to decoding performance of a channel decoding algorithm used by a processor in any upper level channel decoding apparatus before the current channel decoding apparatus, and decoding performance of a channel decoding algorithm used by a lower level channel decoding apparatus is superior to the decoding performance of the channel decoding algorithm used by the processor 202. For example, if the channel decoding apparatus is the first level channel decoding apparatus, the processor 202 may perform decoding by using the VA, and a processor in the second level channel decoding apparatus may perform decoding by using the PLVA or the LVA. For another example, if the channel decoding apparatus is the first level channel decoding apparatus, the processor 202 may perform decoding by using the VA, the processor in the second level channel decoding apparatus may perform decoding by using the PLVA4, and a processor in the third level channel decoding apparatus may perform decoding by using the PLVA64. It should be noted that, herein is merely an example, and this embodiment of the present disclosure is not limited thereto.

When the processor 202 determines that the lower level channel decoding apparatus continues to perform decoding, the lower level channel decoding apparatus may acquire the demodulation information from the current channel decoding apparatus, or may acquire the demodulation information from the demodulator, or may acquire the demodulation information from any upper level channel decoding apparatus before the current channel decoding apparatus, and this embodiment of the present disclosure is not limited thereto. When the processor 202 determines that the lower level channel decoding apparatus continues to decode the demodulation information, the processor 202 may further control the transceiver 204 to transmit the demodulation information to the lower level channel decoding apparatus. In this case, the transceiver 204 may further transmit the current decoding information to the lower level channel decoding apparatus, so that the lower level channel decoding apparatus performs auxiliary decoding according to the decoding information, so as to improve decoding accuracy.

In an embodiment of the present disclosure, when the processor 202 determines that the current decoding CRC check result is correct, decoding may be ended, and the demodulation information does not need to be sent to the lower level channel decoding apparatus. For example, when demodulation information of any substream of AMR is decoded, current decoding information may be sent to an AMR framing module for AMR speech framing together with decoding information of another substream. For a substream A of AMR, a current decoding CRC check result may further be sent to an outer loop power control module for an outer loop power control decision.

In still another embodiment of the present disclosure, if the current channel decoding apparatus is a last level channel decoding apparatus, decoding also needs to be ended. In this case, if a CRC check of the last level channel decoding apparatus fails, a decoding error is reported for the demodulation information because all levels of channel decoding apparatuses fail to obtain a correct decoding result of a CRC check.

It should be noted that, the current channel decoding apparatus and the lower level channel decoding apparatus may be deployed on different network nodes, so as to avoid relatively heavy load caused to processing of a same network node when the current channel decoding apparatus and the lower level channel decoding apparatus are deployed together on the network node. For example, the channel decoding apparatus is deployed on a base station node (NodeB), and the lower level channel decoding apparatus may be deployed on a radio network controller (RNC). For another example, when a transmission node exists between the RNC and the NodeB, the lower level channel decoding apparatus may be deployed on the transmission node between the RNC and the NodeB, and this embodiment of the present disclosure is not limited thereto.

According to the apparatus in this embodiment of the present disclosure, decoding and a CRC check may be performed on any demodulation information of a channel, and it is determined, according to a CRC check result, whether to use a lower level channel decoding apparatus that has higher decoding performance to perform hierarchical decoding. Generally, for most demodulation information, a correct decoding result can be obtained by means of first level decoding, and demodulation information that enters a next level of decoding accounts only for a small fraction of all demodulation information. Compared with a traditional practice of using only one level of decoding apparatus, the apparatus in this embodiment of the present disclosure can not only improve decoding performance, but also avoid high processing overheads caused when all demodulation information is decoded by using a high performance channel decoding apparatus. In addition, all levels of channel decoding apparatuses are distributed on different network nodes, and do not need to be centralized on all NodeBs, thereby reducing a quantity of deployed high performance channel decoding apparatuses, and making configuration more flexible.

Figure 3:
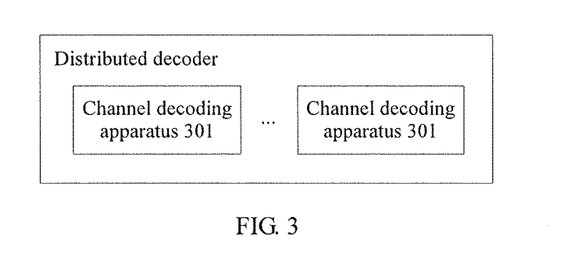
FIG. 3 is a structural diagram of a distributed decoder according to another embodiment of the present disclosure.

FIG. 3 is a structural diagram of a distributed decoder according to an embodiment of the present disclosure. As shown in the figure, the distributed decoder may include at least two channel decoding apparatuses 301, where the channel decoding apparatuses 301 are in a cascading connection between an upper level and a lower level, and decoding performance of a channel decoding algorithm used by a lower level channel decoding apparatus 301 is superior to decoding performance of a channel decoding algorithm used by an upper level channel decoding apparatus 301.

The channel decoding apparatus 301 may be the channel decoding apparatus shown in FIG. 1 or FIG. 2. Because the channel decoding apparatus is already described in the foregoing embodiments, details are not described herein.

Figure 4:
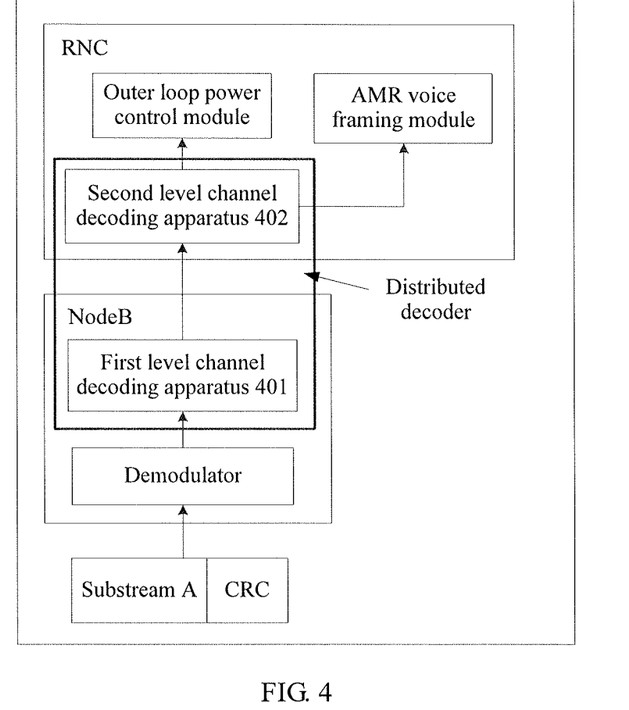
FIG. 4 is a structural diagram of a distributed decoder according to another embodiment of the present disclosure.

Referring to FIG. 4, an example in which the distributed decoder includes two channel decoding apparatuses is used for description. The two channel decoding apparatuses are a first level channel decoding apparatus 401 and a second level channel decoding apparatus 402. The first level channel decoding apparatus 401 is deployed on a NodeB, and the second level channel decoding apparatus 402 is deployed on an RNC. A demodulator is connected to the first level channel decoding apparatus 401, and the first level channel decoding apparatus 401 acquires demodulation information of an AMR substream from the demodulator. A substream A of an AMR speech service is used herein as an example, and certainly, the demodulation information may be demodulation information of a substream B or a substream C, or may be demodulation information of a data service or signaling. The first level channel decoding apparatus 401 decodes, by using a VA, the acquired demodulation information of the substream A to obtain first level decoding information, and performs a CRC check on the first level decoding information. If a CRC check result is incorrect, the first level channel decoding apparatus 401 sends the demodulation information of the substream A to the second level channel decoding apparatus 402, and certainly, may further send the first level decoding information to the second level channel decoding apparatus 402 for auxiliary decoding. The second level channel decoding apparatus 402 decodes, by using a PLVA4 algorithm whose decoding performance is superior to that of the VA, the demodulation information of the substream A to obtain second level decoding information. If the first level decoding information exists, auxiliary decoding may further be performed by using the first level decoding information, and a CRC check is performed on the second level decoding information. If a CRC check result of second level decoding is correct, decoding may be ended, and the current decoding information is sent to an AMR framing module for AMR speech framing together with decoding information of another substream, or the CRC check result of the second level decoding may be sent to an outer loop power control module for an outer loop power control decision. If the CRC check result of the second level decoding is incorrect, the decoding is also ended, and a decoding error is reported at the same time.

It should be noted that, all the foregoing examples are used merely for ease of description. There may also be more than two channel decoding apparatuses. For example, a third level channel decoding apparatus, a fourth level channel decoding apparatus, and the like may also exist. A location at which each channel decoding apparatus is deployed may also be not limited to the NodeB or the RNC as long as the channel decoding apparatuses are distributed on different network nodes, and this embodiment of the present disclosure is not limited thereto. For a function and an implementation manner of each channel decoding apparatus in the distributed decoder, reference may be made to a description of the channel decoding apparatus in FIG. 1 or FIG. 2, and details are not described herein.

According to the distributed decoder in this embodiment of the present disclosure, decoding and a CRC check may be performed on any demodulation information of a channel, and it is determined, according to a CRC check result, whether to use a lower level channel decoding apparatus that has higher decoding performance to perform hierarchical decoding. Generally, for most demodulation information, a correct decoding result can be obtained by means of first level decoding, and demodulation information that enters a next level of decoding accounts only for a small fraction of all demodulation information. Compared with a traditional practice of using only one level of decoding apparatus, the apparatus in this embodiment of the present disclosure can not only improve decoding performance, but also avoid high processing overheads caused when all demodulation information is decoded by using a high performance channel decoding apparatus. In addition, all levels of channel decoding apparatuses are distributed on different network nodes, and do not need to be centralized on all NodeBs, thereby reducing a quantity of deployed high performance channel decoding apparatuses, and making configuration more flexible.

Figure 5:
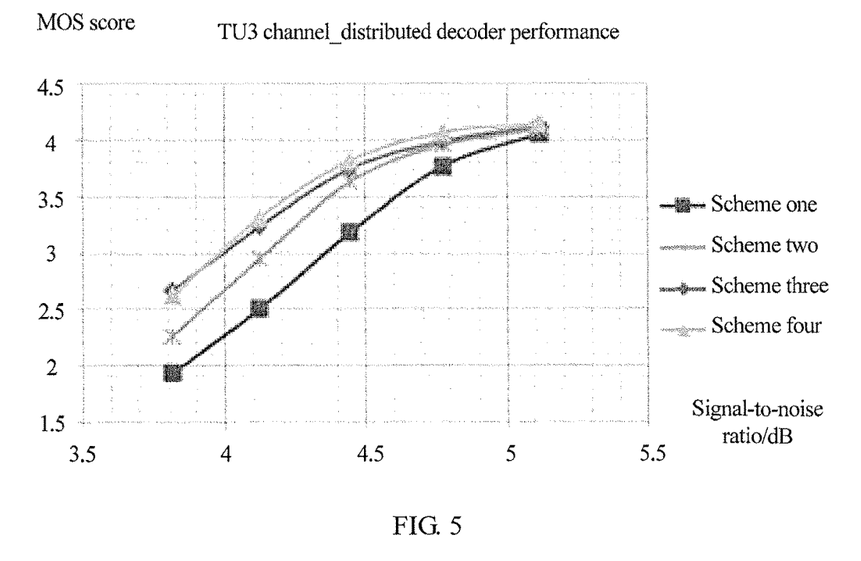
FIG. 5 is a schematic diagram of decoder performance simulations according to another embodiment of the present disclosure.

FIG. 5 illustrates a comparison between performance simulations of several types of decoders in a same scenario. A simulated channel environment is a typical urban area channel environment at a moving speed of 3 kilometers per hour, which is referred to as a TU3 channel for short. A speech service is AMR12.2 k. Assessment is performed by using a mean opinion score (MOS score), and higher decoding performance leads to a higher MOS score. Scheme one: a traditional VA decoder is used to decode each substream of AMR. Scheme two: a distributed decoder is used to decode a substream A of AMR, where a VA is used in first level decoding, and a PLVA4 is used in second level decoding; and a VA decoder is still used to decode another substream of AMR. Scheme three: a distributed decoder is used to decode a substream A of AMR, where a VA is used in first level decoding, a PLVA4 is used in second level decoding, and a PLVA64 is used in third level decoding; and a VA decoder is still used to decode another substream of AMR. Scheme four: a distributed decoder is used to separately decode a substream A and a substream B of AMR, that is, eight check bits are added into the substream B, and the distributed decoder is used to decode the substream B, where a VA is used in first level decoding, a PLVA4 is used in second level decoding, and a PLVA64 is used in third level decoding; and a VA decoder is still used to decode another substream of AMR. It can be learned from FIG. 4 that, at a same signal-to-noise ratio, if a CRC check is performed only on the substream A of AMR, a MOS score of multilevel decoding using a distributed decoder is higher than that of traditional VA decoding; however, if a CRC check is additionally performed on the substream B of AMR, that is, multilevel decoding using a distributed decoder is also performed on the substream B, a MOS score is also higher than a MOS score of distributed decoding, that is, multilevel decoding, only on the sub stream A of AMR.

Figure 6:
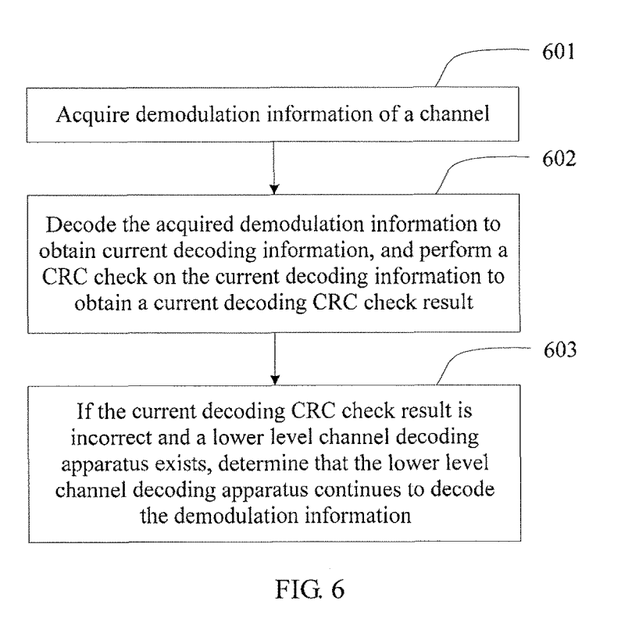
FIG. 6 is a flowchart of a channel decoding method according to another embodiment of the present disclosure.

FIG. 6 is a flowchart of a channel decoding method according to another embodiment of the present disclosure, where the channel decoding method is used in any level of channel decoding apparatus in a distributed decoder, and the distributed decoder includes at least two levels of channel decoding apparatuses. As shown in the figure, the method includes:

Step 601: Acquire demodulation information of a channel. For the demodulation information, the demodulation information of the channel may be directly acquired from a demodulator, or the demodulation information of the channel may be acquired from any upper level channel decoding apparatus before a current channel decoding apparatus, which depends on whether transmission of the demodulation information is supported between the current channel decoding apparatus and the demodulator or between the current channel decoding apparatus and the any upper level channel decoding apparatus. When the demodulation information of the channel is acquired from the any upper level channel decoding apparatus before the current channel decoding apparatus, the any level decoding information may further be acquired from the any upper level channel decoding apparatus before the current channel decoding apparatus, and used as auxiliary decoding information.

Step 602: Decode the demodulation information acquired in step 601 to obtain current decoding information, and perform a CRC check on the current decoding information to obtain a current decoding CRC check result. The demodulation information may be decoded by using multiple channel decoding algorithms. For example, a channel decoding algorithm may be a VA, or may be an LVA, a PLVA, or an SLVA, or may be another channel decoding algorithm, where the PLVA may further be classified into a PLVA4, a PLVA64, and the like according to a quantity of paths searched by the PLVA, and the present disclosure is not limited thereto. Decoding performance of a channel decoding algorithm used by the current channel decoding apparatus is superior to decoding performance of a channel decoding algorithm used by any upper level channel decoding apparatus before the current channel decoding apparatus, and decoding performance of a channel decoding algorithm used by a lower level channel apparatus is superior to the decoding performance of the channel decoding algorithm used by the current channel decoding apparatus.

If the auxiliary decoding information is further acquired in step 601, the auxiliary decoding information may be used for auxiliary decoding when the demodulation information is decoded.

Step 603: If the current decoding CRC check result obtained in step 602 is incorrect and a lower level channel decoding apparatus exists, determine that the lower level channel decoding apparatus continues to decode the demodulation information.

Decoding performance of the lower level channel decoding apparatus is superior to decoding performance of the current channel decoding apparatus.

In an embodiment of the present disclosure, the method may further include the following optional step:

Step 604: If it is determined in step 603 that the lower level channel decoding apparatus continues to perform decoding, transmit the demodulation information to the lower level channel decoding apparatus. Further, the current decoding information may further be transmitted to the lower level channel decoding apparatus, so that the lower level channel decoding apparatus performs auxiliary decoding according to the decoding information.

In another embodiment of the present disclosure, the method may further include the following optional steps:

Step 605: If the current decoding CRC check result obtained in step 602 is correct, decoding may be ended; or Step 606: If the current channel decoding apparatus is a last level channel decoding apparatus, decoding also needs to be ended. In this case, if a CRC check of the last level channel decoding apparatus fails, a decoding error is reported for the demodulation information because all levels of channel decoding apparatuses fail to obtain a correct decoding result of a CRC check.

It should be noted that, the current channel decoding apparatus and the lower level channel decoding apparatus may be deployed on different network nodes, so as to avoid relatively heavy load caused to processing of a same network node when the current channel decoding apparatus and the lower level channel decoding apparatus are deployed together on the network node.

Functions of the steps of the method in this embodiment of the present disclosure can be implemented correspondingly by components of the foregoing apparatus embodiments, which is described in the foregoing apparatus embodiments, and details are not described herein.

According to the method in this embodiment of the present disclosure, decoding and a CRC check may be performed on any demodulation information of a channel, and it is determined, according to a CRC check result, whether to use a lower level channel decoding apparatus that has higher decoding performance to perform hierarchical decoding. Generally, for most demodulation information, a correct decoding result can be obtained by means of first level decoding, and demodulation information that enters a next level of decoding accounts only for a small fraction of all demodulation information. Compared with a traditional method of using only one level of decoding, the method in this embodiment of the present disclosure can not only improve decoding performance, but also avoid high processing overheads caused when all demodulation information is decoded by using a high performance channel decoding apparatus. In addition, all levels of channel decoding apparatuses are distributed on different network nodes, and do not need to be centralized on all NodeBs, thereby reducing a quantity of deployed high performance channel decoding apparatuses, and making configuration more flexible.

With descriptions of the foregoing embodiments, a person skilled in the art may clearly understand that the present disclosure may be implemented by hardware, firmware, or a combination of hardware and firmware. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another optical disc storage, a magnetic disk storage medium or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. For example, a disk (Disk) and a disc (disc) used by the present disclosure include a compact disc (CD), a laser disc, an optical disc, a digital versatile disc (DVD), a floppy disk, and a Blu-ray disc, where the disk generally copies data in a magnetic manner, and the disc copies data in an optical manner by using laser. A combination of the foregoing should also be included in the protection scope of the computer-readable medium.

In summary, the foregoing descriptions are merely exemplary embodiments of the technical solutions of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A channel decoding method, comprising:
    acquiring, by a channel decoding apparatus included in a base station, demodulation information of a channel;
    decoding, by the channel decoding apparatus included in the base station, the demodulation information to obtain current decoding information, and performing a cyclic redundancy check (CRC) on the current decoding information to obtain a current decoding CRC check result; and
    in response to determining that the current decoding CRC check result is incorrect and determining that a lower level channel decoding apparatus is included in a radio network controller, transmitting, by the channel decoding apparatus included in the base station, the demodulation information to the lower level channel decoding apparatus included in the radio network controller, wherein a decoding performance of the lower level channel decoding apparatus included in the radio network controller is superior to a decoding performance of the channel decoding apparatus included in the base station.

2. The method according to claim 1, wherein the acquiring demodulation information of the channel comprises:
    acquiring the demodulation information of the channel from a demodulator.

3. The method according to claim 1, wherein the method further comprises:
    transmitting the current decoding information to the lower level channel decoding apparatus included in the radio network controller to perform auxiliary decoding.

4. The method according to claim 1, wherein the method further comprises:
    ending decoding in response to determining that the current decoding CRC check result is correct.

5. The method according to claim 1, wherein the demodulation information is any one of the following: demodulation information of any substream of an adaptive multi-rate (AMR) speech service, demodulation information of a data service, or demodulation information of signaling.

6. The method according to claim 1, wherein the decoding the demodulation information to obtain current decoding information is decoding the demodulation information based on a Viterbi decoding algorithm (VA), and performing, by the lower level channel decoding apparatus, decoding based on a list Viterbi algorithm (LVA), a parallel list Viterbi algorithm (PLVA), or a serial list Viterbi algorithm (SLVA).

7. The method according to claim 1, wherein the acquiring demodulation information of the channel comprises:
    acquiring the demodulation information of the channel from any upper level channel decoding apparatus before the channel decoding apparatus included in the base station.

8. The method according to claim 1, wherein the method further comprises:
    ending decoding in response to determining that the channel decoding apparatus is a last level channel decoding apparatus.

9. The method according to claim 7,
    wherein the demodulation information of the channel is acquired from the any upper level channel decoding apparatus before the channel decoding apparatus included in the base station,
    wherein the acquiring demodulation information of the channel further comprises:
        acquiring any upper level decoding information from the any upper level channel decoding apparatus before the channel decoding apparatus included in the base station, and using the any upper level decoding information as auxiliary decoding information; and
    wherein the decoding the demodulation information to obtain current decoding information further comprises:

performing auxiliary decoding on the demodulation information based on the auxiliary decoding information.

10. A channel decoding apparatus included in a base station, comprising:
a bus;
a processor connected to the bus;
a memory connected to the bus; and
a transceiver connected to the bus,
wherein the processor executes, by using the bus, a program stored in the memory to:
acquire demodulation information of a channel;
decode the demodulation information to obtain current decoding information, and perform a cyclic redundancy check (CRC) on the current decoding information to obtain a current decoding CRC check result; and
in response to determining that the current decoding CRC check result is incorrect and determining that a lower level channel decoding apparatus is included in a radio network controller, transmit the demodulation information to the lower level channel decoding apparatus, wherein decoding performance of the lower level channel decoding apparatus included in the radio network controller is superior to decoding performance of the channel decoding apparatus included in the base station.

11. The apparatus according to claim 10, wherein the processor is further configured to:
acquire the demodulation information of the channel from a demodulator.

12. The apparatus according to claim 10, the transceiver is further configured to:
transmit the current decoding information to the lower level channel decoding apparatus included in the radio network controller to perform auxiliary decoding.

13. The apparatus according to claim 10, wherein the processor is further configured to:
end decoding in response to determining that the decoding CRC check result is correct.

14. The apparatus according to claim 10, wherein the demodulation information is any one of the following: demodulation information of any substream of an adaptive multi-rate (AMR) speech service, demodulation information of a data service, or demodulation information of signaling.

15. The apparatus according to claim 10, wherein the processor performs decoding based on a Viterbi decoding algorithm (VA), and the processor in the lower level channel decoding apparatus performs decoding based on a list Viterbi algorithm (LVA), a parallel list Viterbi algorithm (PLVA), or a serial list Viterbi algorithm (SLVA).

16. The apparatus according to claim 10, wherein the processor is further configured to:
acquire the demodulation information of the channel from any upper level channel decoding apparatus before the channel decoding apparatus included in the base station.

17. The apparatus according to claim 10, wherein the processor is further configured to:
end decoding in response to determining that the channel decoding apparatus is a last level channel decoding apparatus.

18. The apparatus according to claim 16,
wherein the demodulation information of the channel is acquired from the any upper level channel decoding apparatus before the channel decoding apparatus included in the base station; and
wherein the processor is further configured to:
acquire any upper level decoding information from the any upper level channel decoding apparatus before the channel decoding apparatus included in the base station, and use the any upper level decoding information as auxiliary decoding information, and
use the auxiliary decoding information to perform auxiliary decoding on the demodulation information.

* * * * *